United States Patent Office 3,024,247
Patented Mar. 6, 1962

3,024,247
NON-CRYSTALLIZING PHTHALOCYANINE
COLORING MATTERS
Frank H. Moser and James D. Stepp, Huntington, W.
Va., assignors to Standard Ultramarine & Color Co.,
Huntington, W. Va., a corporation of West Virginia
No Drawing. Filed May 26, 1958, Ser. No. 737,547
8 Claims. (Cl. 260—314.5)

This invention relates to phthalocyanine colors and, more particularly, to a process for the manufacture of non-crystallizing phthalocyanine coloring matters. This invention also embraces phthalocyanine coloring matters which are both non-crystallizing and non-flocculating, and a process for the manufacture of such coloring matters.

Phthalocyanine coloring matters, generally characterized as resonating heterocyclic structures in which four aromatic rings are combined by extracyclic nitrogen atoms, in many respects constitute ideal pigments for industrial enamels, lacquers and other protective coatings. These coloring matters range from a pure blue to green in tone and exhibit high tinting strength, excellent resistance to acids, alkalies and heat, and excellent light fastness.

While refinements in the production of phthalocyanine colors have greatly improved their resistance to flocculation and their texture, phthalocyanines known to the prior art, especially the bluer coloring matters, have demonstrated the undesirable property of forming large crystals in solvents such as aromatic solvents, esters and chlorinated solvents which are employed as vehicles for coating compositions. Because coating compositions are commonly subjected to long periods of storage, it is highly desirable if not absolutely essential that the coloring matter be completely non-crystallizing in order to provide the requisite stability for the coating composition.

In its quest for a non-crystallizing phthalocyanine coloring matter, the prior art has blended minor proportions of tin phthalocyanine with copper phthalocyanine to produce colors with a reduced tendency to crystallize. The blended coloring matters, however, are deficient in tinting strength and tone. Alternatively, the art has subjected phthalocyanines to ball mill grinding to reduce crystallization. This time consuming and tedious process, though it reduces the tendency of phthalocyanines to crystallize, does not yield consistent results.

The prior art, as exemplified by U.S. Patents 2,615,027 and 2,618,642, additionally has recognized that the presence of chlorine in the phthalocyanine molecule aids to reduce the tendency of phthalocyanine coloring matters to crystallize. Employing this concept, the process described in U.S. Patent 2,615,027 combines phthalic anhydride, urea, cuprous chloride and approximately 1 to 2% of chlorine to produce a copper phthalocyanine containing small amounts of aluminum phthalocyanine which, after acid-pasting, yields a pigment that is stated to exhibit good non-crystallizing properties. The somewhat analogous process described in U.S. Patent 2,618,642 combines copper phthalocyanine with trichlorobenzene, aluminum chloride, and 1 to 2% chlorine to yield, after acid-pasting, a copper phthalocyanine pigment which also is stated to exhibit good non-crystallizing properties.

Chlorine also has been employed in the processes set forth in U.S. Patents 2,662,085 and 2,793,214 which are primarily directed to the production of green phthalocyanine pigments of exceptionally high chlorine content. In these processes chlorine is contacted with a phthalocyanine which has been dissolved in one of several specifically enumerated sulfonic acids. Subsequent acid-pasting yields a suitable phthalocyanine pigment which, depending upon the extent of chlorination, may vary from blue to green in color.

While the prior art processes, employing various treatments prior to acid-pasting, result in improved non-crystallizing characteristics, the prior art processes fail to produce a completely non-crystallizing phthalocyanine. Consequently, though these pigments be blended with phthalocyanine sulfonic acids as taught, for example, in U.S. Patent 2,526,345 to prevent flocculation and the resulting loss of color strength, the final product nevertheless tends to deteriorate due to crystallization.

It is accordingly a primary object of this invention to provide a method for the manufacture of non-crystallizing phthalocyanine coloring matters.

It is a further object of this invention to provide a method for producing non-crystallizing phthalocyanine coloring matters which retain excellent color integrity.

It is a still further object of this invention to provide a method for producing blue phthalocyanine coloring matters which form no crystals from a 2% dispersion of the coloring matter in xylene when maintained at a temperature of 70° C. for 24 hours.

It is an additional object of this invention to provide non-crystallizing, non-flocculating phthalocyanine coloring matters.

It is yet another object of this invention to provide a method for the manufacture of non-crystallizing, non-flocculating phthalocyanine coloring matters.

In accordance with the present invention, it has been discovered that non-crystallizing phthalocyanine coloring matters may be produced by a method which comprises contacting an acid-pasted phthalocyanine having, on an average, less than about 15 chlorine atoms per molecule with chlorine to produce a phthalocyanine which contains, on the average, at least about 0.5 atom of chlorine per molecule more than the starting material.

The process of the present invention, employing an acid-pasted phthalocyanine as the starting material, produces a non-crystallizing coloring matter which requires no further acid-pasting and which is in suitable form for blending directly with coating compositions. The non-crystallizing coloring matters produced by the method of this invention maintain a high color integrity and demonstrate a higher tinctorial strength over coloring matters produced by grinding the phthalocyanine to put it in satisfactory pigmentary form. The term "non-crystallizing" as employed herein refers to coloring matters which will not crystallize from a 2% dispersion in xylene maintained at 70° C. for 24 hours, a crystallization test employed in the pigment art.

Acid-pasted phthalocyanines treated in accordance with one preferred specific embodiment of this invention may be rendered non-crystallizing by a method which comprises contacting a dry, acid-pasted, finely powdered phthalocyanine with chlorine to produce a phthalocyanine having the requisite degree of chlorination.

In accordance with another preferred specific embodiment of this invention, phthalocyanines may be rendered non-crystallizing by a method which comprises contacting a slurry of dry acid-pasted phthalocyanine in a substantially inert chlorinated-hydrocarbon with chlorine to provide the requisite degree of chlorination, subjecting the mixture to distillation to remove said chlorinated hydrocarbon and drying the pigment so produced. The substantially inert organic liquid may be a chlorinated aromatic or saturated aliphatic hydrocarbon. Organic liquids having a low boiling point are preferred so that the liquid may be removed readily from the reaction mixture by distillation or by steam distillation. Since the presence of water inhibits the chlorination and, moreover, since water forms with chlorine an oxidizing system which is harmful to phthalocyanine, the presence of water in the coloring matter or in the reaction mixture is undesirable.

The temperature at which the chlorination takes place is not critical and appropriately may be varied from ambient temperatures to 200° C. or more. It is preferred, however, to conduct the chlorination at a temperature from about 20° C. to about 60° C. Unlike many of the prior art processes, the chlorination of this invention does not require a catalyst although a catalyst may be employed.

While it has been determined that the addition of at least about 3% chlorine, or, on the average, of about 0.5 atom of chlorine per phthalocyanine molecule will impart non-crystallizing properties to the acid-pasted phthalocyanine coloring matters, any desired amount of chlorine up to the maximum capacity of 16 chlorine atoms per molecule may be added to the phthalocyanine. It is preferred, however, to add only from about 0.5 to about 2.0 chlorine atoms per molecule of phthalocyanine since greater quantities of chlorine exhibit a more pronounced tendency to shade the color towards green.

The phthalocyanine colors which may be treated by the method of this invention include both the metal-free phthalocyanine colors and the metal phthalocyanine colors such as, for example, copper phthalocyanine and iron phthalocyanine, and the like. These acid-pasted colors may be chlorine-free or may be partially chlorinated up to about 15 chlorine atoms per phthalocyanine molecule. The bluer phthalocyanines which range from 0 to about 8 chlorine atoms per molecule and exhibit the most pronounced tendency toward crystallization are most appropriate starting materials for the present invention.

The acid-pasting procedures to which the phthalocyanines are subjected prior to their utilization in the method of the present invention may constitute any of the acid-pasting procedures employed by the art. Crude phthalocyanine coloring material, for example, may be dissolved in an acid such as 95% sulfuric acid, drowned in water, filtered, dried and pulverized to the desired mesh size. Other acids such as chlorosulfonic acid, phosphoric acid, fuming sulfuric acid and the like, as well as mixtures of them, also may be employed in the acid-pasting procedure. Additionally, the acid-pasting may be effected by the permutoid swelling method illustrated in Example V. Procedures for acid-pasting phthalocyanine are well-known to those skilled in the art and will not be further described here since they form no part of this invention.

The equipment employed for the chlorination of the present invention is not critical to the process. It is preferred, however, that the equipment be provided with agitating means to insure intimate contact between the chlorine and the phthalocyanine coloring matter. Moreover, since the chlorination of phthalocyanine is an exothermic reaction, in some instances it may be found desirable to provide the equipment with both heating and cooling means. Alternatively, by judicious selection of equipment and careful control, the heat of reaction may be utilized to aid in maintaining the reaction mixture at the desired temperature. While the present invention is exemplified as a batch process, it will be apparent to those skilled in the art that the invention may also be practiced as a continuous process.

This invention further contemplates non-crystallizing, non-flocculating phthalocyanine coloring matters produced by blending a phthalocyanine monosulfonic acid with a water slurry of acid-pasted, after chlorinated phthalocyanine to provide from about 5% to about 20% and preferably from about 10% to about 15% by weight of phthalocyanine monosulfonic acid based on the weight of the chlorinated phthalocyanine. Accordingly, a preferred process embodiment of this phase of the invention comprises contacting a substantially inert chlorinated hydrocarbon slurry of an acid-pasted phthalocyanine having, on the average, less than 15 chlorine atoms per molecule, and preferably less than 8 chlorine atoms per molecule, with chlorine to produce a phthalocyanine which contains, on the average, at least about 0.5 atom of chlorine per molecule more than the starting materials; subjecting the mixture to steam distillation to remove said chlorinated hydrocarbon; admixing a phthalocyanine monosulfonic acid with the resulting water slurry of chlorinated phthalocyanine to provide from about 5% to about 20% and preferably from about 10% to about 15% by weight of phthalocyanine monosulfonic acid based on dry chlorinated phthalocyanine, and drying the admixed phthalocyanines.

Incorporation of either metal-free or metal containing phthalocyanine monosulfonic acid renders the coloring matter non-flocculating yet does not adversely effect the non-crystallizing properties of the final blend. Since the non-crytallizing, non-flocculating coloring matter is obtained by blending ingredients which themselves are coloring matters, the final blend may contain 100% color. These coloring matters exhibit exceptional color strength. Phthalocyanine monosulfonic acids are well known to the art and may be produced, for example, by the method described in U.S. Patent 2,526,345.

In order more fully to describe the present invention, the practice of this invention will be discussed in relation to its more preferred embodiments.

A suitable vessel is filled with chlorine gas at room temperature and dry, acid-pasted copper phthalocyanine is added to the chlorine-filled vessel in quantities requisite to provide approximately 3 parts of phthalocyanine per part of chlorine. The contents of the vessel are heated to approximately 50° C. and are periodically agitated throughout a reaction period of approximately ½ hour during which an exothermic reaction takes place. The vessel then is evacuated and purged with air to remove the residual chlorine and hydrochloric acid gas. The product is non-crystallizing and may be employed directly as a pigment for a coating composition.

As an alternate method of chlorinating phthalocyanine, an acid-pasted phthalocyanine coloring matter is slurried with 6 parts of dry carbon tetrachloride containing a trace of iodine. After adjusting the temperature to about 45° C., 0.1 part of chlorine is added and the slurry is agitated. After a 1 hour contact period, approximately .1 part sodium bicarbonate and minor amounts of triethanolamine and myristic acid are added and the mixture again is agitated for 30 minutes. Live steam is then introduced into the mixture to distill off the carbon tetrachloride. Following the removal of the carbon tetrachloride, the slurry is heated for an additional 30 minutes and filtered. The filter cake, after washing with about 200 parts of water, is dried at 70° C. to yield a non-crystallizing phthalocyanine color which may be added without further treatment to a coating composition.

In the event the coloring matter is to be treated to obtain a final non-crystallizing, non-flocculating coloring matter, phthalocyanine monosulfonic acid may be added to the water slurry obtained by the steam distillation described above. Phthalocyanine monosulfonic acid is added in amounts of from about 5 to about 20 and preferably from about 10 to about 15 parts by weight of dry phthalocyanine monosulfonic acid per 100 parts by weight of dry, acid-pasted, after-chlorinated phthalocyanine coloring matter. The mixture may be heated for ½ hour at a temperature of about 45° C. The pH advantageously then may be lowered to about 1.5 and the slurry agitated for an additional ½ hour at a temperature of about 70° C. The mixture then may be filtered, washed with water and dried at about 65° C.

The present invention will be more fully illustrated by the following specific examples. These examples are included for illustrative purposes only and in no way limit the scope of the invention.

Example I

A three liter flask was filled with chlorine gas (approximately 8.66 parts) by displacement of the air. Twenty-five parts of dry acid-pasted chlorine-free copper phthalocyanine were added to the chlorine filled flask and the flask was shaken at intervals throughout a period of ½ hour during which an exothermic reaction took place. The flask then was purged with air to remove residual chlorine and hydrochloric gases. The yield of 27.5 parts of dry copper phthalocyanine blue was given an aqueous alkaline treatment and dried.

One part of the treated pigment was heated with 50 parts of xylene for 24 hours at approximately 70° C. Microscopic examination of a slide prepared from the xylene dispersion revealed no crystallization.

Example II

Ten parts of dry acid-pasted iron phthalocyanine were treated with 6 parts of dry chlorine gas at approximately 25° C. for 1 hour. The treating vessel then was purged with air to remove residual chlorine and hydrochloric acid gases. The yield of dry pigment was 11 parts.

One part of the pigment so obtained was mixed with 50 parts xylene and the dispersion was heated to 70° C. for 24 hours. Microscopic examination at the end of the time period indicated that no crystals had been formed.

Example III

A two liter, three neck flask was equipped with agitator, gas inlet, and thermometer. Approximately 640 parts of dry carbon tetrachloride, 0.1 part of iodine, and 100 parts of dry acid-pasted chlorine-free copper phthalocyanine were added to the flask and the temperature of the mixture was adjusted to 45° C. About 10 parts of chlorine gas were added to the mixture and the slurry was agitated at about 45° to about 50° C. for 1 hour. Fifteen parts of sodium bicarbonate, 4 parts of triethanol amine, and 4 parts of myristic acid then were added, and the mixture was stirred for an additional 30 minutes following which live steam was introduced through the gas inlet in order to remove the carbon tetrachloride by steam distillation. After the carbon tetrachloride had been removed, the heating was continued for 30 minutes. The slurry then was filtered and the filter cake was washed with 2,000 parts of water and dried at 70° C. The process yielded 104 parts of pigment.

The product, when tested according to the procedures set forth in Example I, was non-crystallizing.

Example IV

Approximately 24 parts of dried acid-pasted, metal-free phthalocyanine blue were suspended in 400 parts of dry carbon tetrachloride containing 0.1 part of iodine and the temperature was adjusted to between 45° C. and 50° C. The mixture was agitated while 5 parts of chlorine gas were added, the slurry then was stirred for 1 hour, and 7.5 parts of sodium bicarbonate, 1 part of myristic acid, and 1 part of triethanolamine were added.

The carbon tetrachloride was steam distilled off leaving a water slurry which was colloid milled, filtered, washed free of soluble solids, and dried at about 70° C. The process produced 25 parts of pigment.

Three parts of the pigments so produced were mixed with 45 parts of xylene for 24 hours at 70° C. No crystals were formed.

Example V

Approximately 100 parts of crude chlorine-free copper phthalocyanine prepared according to U.S. Patent 2,649,663 were admixed with 640 parts of carbon tetrachloride. After blending, 160 parts of the carbon tetrachloride were distilled off to remove any water present. The mixture was cooled to 45° C., 15 parts of chlorine gas were added, and the mixture was agitated for 2 hours. Fifteen parts of sodium bicarbonate then were added to the mixture and the carbon tetrachloride was steam distilled off. The resulting water slurry was filtered, washed with water and dried. The procedure produced 103 parts of pigment.

Fifty parts of the dried blue pigment were slurried in 500 parts of 65% sulfuric acid at 50° C. for 2 hours. The acid color slurry then was admixed with 2,000 parts of cold water, stirred for ½ hour and washed acid-free. The filter cake was subjected to a mild alkaline treatment, filtered, washed and dried. One part of the dried pigment was mixed with 50 parts of xylene at 70° C. for 24 hours. The pigment crystallized.

Twenty-five parts of the above acid-pasted pigment were subjected to the treatment of Example I and upon suspending in xylene at 70° C. for 24 hours were found to be non-crystallizing.

Example VI

Following the teaching of U.S. Patent 2,649,663, monochloro copper phthalocyanine was prepared by admixing the following compounds.

| | Parts |
|---|---|
| Powdered phthalic acid anhydride | 28 |
| Powdered 10% chlorinated phthalic acid anhydride | 24.5 |
| Urea | 80 |
| Copper powder (100% 325 mesh) | 6 |
| Zirconium tetrachloride | 5 |
| Ammonium perchlorate | 5 |
| Trichlorobenzene | 500 |

The mixture was agitated and heated to 175° C.–180° C. for 4 hours, cooled and filtered. The filter cake was freed from trichlorobenzene by washing with alcohol. A yield of 50 parts of monochloso copper phthalocyanine was obtained after a mild acid and alkaline treatment.

The crude monochloro copper phthalocyanine was purified by dissolving in concentrated (96%) sulfuric acid and reprecipitating in cold water, filtering, washing and drying. Crystallization took place when 1 part of the monochloro copper phthalocyanine was heated in 50 parts of xylene at 70° C. for 24 hours.

Treatment of the pigment in the manner described in Example 1 converted the pigment to a completely non-crystallizing form.

Example VII

Forty parts of dry acid-pasted copper phthalocyanine were mixed with 200 parts anhydrous aluminum chloride and 40 parts anhydrous sodium chloride. After heating the mixture to 150° C. and agitating to produce homogeneity, 38.4 parts of chlorine gas were passed into the mixture during a period of 9 minutes. The mixture was maintained at 150° C. for 1 hour and then poured into 2,000 parts of cold water. The resulting water slurry was heated to 70° C. at a pH of 3.0 to 3.5 for 1 hour, filtered and washed acid-free. The cake was dried at about 65° C. to yield 42.5 parts of coloring matter.

After acid-pasting in a conventional manner, the pigment crystallized when admixed with xylene at 70° C. for 24 hours.

Ten parts of the dry acid-pasted product were reacted with 6 parts of dry chlorine gas at approximately 25° C. for 4 hours, subjected to a dilute alkaline treatment, and dried. One part of the pigment so prepared was admixed with 50 parts of xylene and allowed to stand at 70° C. for 24 hours. Microscopic examination of a slide prepared from the xylene slurry showed no crystallization.

Example VIII

Example VII was repeated employing 45 parts of crude copper phthalocyanine as the starting material. Identical results were obtained.

Example IX

Example III of U.S. Patent 2,618,642 was duplicated and the product was tested for crystallization both before and after it was subjected to the dispersion treatment described in that patent. The crystallization tests were conducted in a toluene solution for 72 hours as outlined in U.S. 2,618,642 and, additionally, were conducted in a 2% dispersion in xylene at 70° C. for 24 hours. Crystallization resulted in all instances.

*Example X*

In order to test further the equivalency of the toluene test for crystallization described in U.S. Patent 2,618,642 and the 2% coloring matter dispersion in xylene at 70° C. for 24 hours employed herein, the products of this invention were subjected to both tests and were non-crystallizing in both instances.

*Example XI*

Example I of U.S. Patent 2,662,085 was duplicated, chlorinating to the degree contemplated by this invention. The product, containing, on the average, approximately 0.5 atom of chlorine per molecule of phthalocyanine, crystallized when subjected to either of the tests described in Example X.

*Example XII*

Example I of U.S. Patent 2,793,214 was duplicated, chlorinating to the degree contemplated by this invention. The product, containing, on the average, approximately 0.5 atom of chlorine per molecule of phthalocyanine, crystallized when subjected to either of the tests described in Example X.

*Example XIII*

In order to demonstrate the criticality of the sequence of treating steps, 50 parts of a non-crystallizing phthalocyanine prepared according to Example III were admixed with 450 parts of 96% sulfuric acid. The mixture was heated at about 60° C. for 2 hours and then at about 80° C. for an additional two hours. Subsequent to heating the mixture was poured into 1400 parts of cold water and the slurry thus formed was boiled for 2 hours, filtered and washed acid-free. The filter cake was given a mild alkaline treatment, was filtered and dried to yield 45 parts of acid-pasted pigment. One part of the acid-pasted pigment was dispersed in 50 parts of xylene and the dispersion was maintained at 70° C. for 24 hours. Examination at the end of the 24 hour period indicated that large crystals had formed.

*Example XIV*

To the water slurry resulting from steam distillation in Example III was added 11.0 parts, dry basis, of copper phthalocyanine monosulfonic acid press cake. The blend was heated for ½ hour at 45° C. The pH then was lowered to 1.5 and the slurry was agitated at 70° C. for an additional ½ hour. After filtering and water washing, the filter cake was dried at 65° C. to yield 115 parts of a non-crystallizing, non-flocculating pigment.

In order to test the resistance to flocculation of the pigment so produced, 2.5 parts of the pigment, 25 parts of anatase titanium dioxide and 50 parts of blown castor oil were ground by subjecting the blend to six passes on a three-roll mill. Thirty-five parts of the color base so produced, 175 parts of clear nitrocellulose lacquer and 25 parts of lacquer thinner were mixed thoroughly to produce the test lacquer. A tin coated steel panel was sprayed with two double coats of lacquer and allowed to air dry. The remaining lacquer was allowed to stand for thirty minutes and then was hand mixed to uniformity and poured over a portion of the sprayed panel. The panel was air dried for ten minutes and force dried at about 85° C. for twenty minutes. The strength of the sprayed coating was compared spectrophotometrically with the poured coating by subjecting the coatings to reflectance measurements at 615 mu wavelength versus MgO using a 5 mu band with. The strength of the coating was identical demonstrating that no flocculation had occurred.

When subjected to the xylene test, as described in Example I, the pigment blend revealed no crystallization.

*Example XV*

The process of Example III was repeated employing 250 parts of a slurry of acid-pasted copper phthalocyanine blue in carbon tetrachloride. Fifteen parts of sodium bicarbonate, 1 part of triethanolamine in myristic acid were added to the chlorinated phthalocyanine and the mixture was stirred for ½ hour. Steam distillation removed the carbon tetrachloride leaving an aqueous slurry containing 36 parts of non-crystallizing copper phthalocyanine blue. To this slurry was added 3.4 parts, dry basis, of copper phthalocyanine monosulfonic acid press cake. The slurry was heated at 100° C. for ½ hour. The pH then was lowered to about 1.5 with hydrochloric acid and the slurry was heated at 75° C. for an additional ½ hour. Filtering, washing and drying at about 65° C. yielded approximately 39 parts of non-crystallizing, non-flocculating phthalocyanine coloring matter. When the coloring matter was subjected to the tests described in Example XIV, the pigment showed substantially no flocculation and no crystallization.

*Example XVI*

Example XV was repeated employing 4.2 parts, dry basis, of copper phthalocyanine monosulfonic acid. The process yielded 40 parts of non-crystallizing, non-flocculating coloring matter. When subjected to the tests described in Example XIV, the coloring matter demonstrated no tendency either to flocculate or to crystallize.

Since modifications of the invention will be apparent to those skilled in the art, it is intended that the invention be limited only by the scope of the appended claims.

This application is a continuation-in-part of application Serial No. 688,426, filed October 7, 1957, entitled "Non-Crystallizing Phthalocyanine Coloring Matters," now abandoned.

What is claimed is:

1. The method of producing non-crystallizing phthalocyanine coloring matters which comprises contacting an acid-pasted substantially water-free phthalocyanine color selected from the group consisting of copper, iron and metal-free phthalocyanine colors, which colors have on the average from zero to eight chlorine atoms per molecule with chlorine at a temperature above about 20° C. to produce a chlorinated phthalocyanine which contains on the average at least about 0.5 atom of chlorine per molecule more than the starting material.

2. The method of claim 1 wherein the chlorination is effected in the presence of a liquid, substantially inert chlorinated hydrocarbon.

3. The method of claim 1 wherein the chlorination is effected with the acid-pasted phthalocyanine in the finely powdered, dry state.

4. The method of claim 1 wherein the phthalocyanine is contacted with chlorine at a temperature from about 20° C. to about 200° C.

5. The method of claim 1 wherein the treated phthalocyanine contains, on the average, from about 0.5 to about 2.0 atoms of chlorine per molecule more than the starting material.

6. The method of claim 1 wherein copper phthalocyanine is employed as the starting material.

7. The method of producing non-crystallizing, non-flocculating phthalocyanine coloring matter which comprises contacting a slurry of an acid-pasted, substantially water-free phthalocyanine color in an inert chlorinated hydrocarbon with chlorine to produce a chlorinated phthalocyanine which contains on the average at least about 0.5 atom of chlorine per molecule more than the starting material, said phthalocyanine color containing on the average from zero to eight chlorine atoms per molecule and being selected from the group consisting of copper, iron and metal-free phthalocyanine colors; subjecting said mixture to steam distillation to remove said chlorinated hydrocarbon, admixing a phthalocyanine monosulfonic acid with the resulting water slurry of chlorinated phthalocyanine coloring to provide from about 10% to about 15% by weight of phthalocyanine monosulfonic acid based on the dry chlorinated phthalocyanine and drying the mixture.

8. The method of claim 7 wherein the phthalocyanine starting material and the phthalocyanine monosulfonic acid are copper phthalocyanines.

References Cited in the file of this patent

UNITED STATES PATENTS

| | | |
|---|---|---|
| 2,486,304 | Laukomsky | Oct. 25, 1949 |
| 2,586,598 | Barnhart | Feb. 19, 1952 |
| 2,611,771 | Marnon | Sept. 23, 1952 |
| 2,615,026 | Lytle | Oct. 21, 1952 |
| 2,615,027 | Bluemmel | Oct. 21, 1952 |
| 2,618,642 | Keller et al. | Nov. 18, 1952 |
| 2,662,085 | Holtzman et al. | Dec. 8, 1953 |
| 2,681,347 | Pedersen | June 15, 1954 |
| 2,799,594 | Ehrich | July 16, 1957 |